(12) United States Patent
Boice et al.

(10) Patent No.: US 6,914,939 B1
(45) Date of Patent: Jul. 5, 2005

(54) METHOD AND APPARATUS FOR PRODUCING PSEUDO-CONSTANT BITS PER PICTURE VIDEO BIT-STREAMS FOR LOW-DELAY COMPRESSION SYSTEM

(75) Inventors: Charles E. Boice, Endicott, NY (US); Brian J. Cascarino, Apalachin, NY (US); Nader Mohsenian, Plainsboro, NJ (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 09/711,762

(22) Filed: Nov. 13, 2000

(51) Int. Cl.$^7$ .......................... H04N 7/12; H04N 11/04; H04N 11/02
(52) U.S. Cl. ............................. 375/240.21; 375/240.12; 375/240.13
(58) Field of Search ....................... 375/240.21, 240.12, 375/240.13

(56) References Cited

U.S. PATENT DOCUMENTS

| | | | |
|---|---|---|---|
| 5,576,767 A | | 11/1996 | Lee et al. .................. 348/413 |
| 5,592,226 A | * | 1/1997 | Lee et al. ............... 375/240.14 |
| 5,652,629 A | | 7/1997 | Gonzales et al. ........... 348/699 |
| 5,760,836 A | | 6/1998 | Greenfield et al. ......... 348/419 |
| 5,793,895 A | | 8/1998 | Chang et al. .............. 382/236 |
| 5,835,147 A | | 11/1998 | Florentin et al. ........... 348/416 |
| 6,008,847 A | | 12/1999 | Bauchspies ................. 348/391 |
| 6,008,848 A | * | 12/1999 | Tiwari et al. ............ 375/240.12 |
| 6,125,147 A | * | 9/2000 | Florencio et al. ........ 375/240.29 |
| 6,466,625 B1 | * | 10/2002 | Kobayashi et al. .... 375/240.29 |
| 6,563,549 B1 | * | 5/2003 | Sethuraman .............. 348/700 |

FOREIGN PATENT DOCUMENTS

EP 0 833 517 A2 4/1998 ............ H04N/7/30

OTHER PUBLICATIONS

"DCT Interpolation for Motion Video", disclosed anonymously 322103, reproduced from Research Disclosure, Feb. 1991, No. 322, copyright Kenneth Mason Publications, Ltd., England.

* cited by examiner

*Primary Examiner*—Chris Kelley
*Assistant Examiner*—Charles Parsons
(74) *Attorney, Agent, or Firm*—William H. Steinberg, Esq.; Kevin P. Radigan, Esq.; Heslin Rothenberg Farley & Mesiti, P.C.

(57) ABSTRACT

A frequency domain data management technique for producing pseudo-constant bits per picture compressed video bit-streams in a low delay digital encoding environment is presented. This technique forms a hierarchy among the localized samples of the picture in terms of frequency importance and the picture difficulty after a shot-change is detected. After a shot change, the data management technique implements a series of tasks composed of picture difficulty evaluation, frequency classification, frequency constraining, and zero bytes generation to achieve a predetermined average picture bits. Further, the low delay encoder uses a unique updating mechanism to encode certain regions of the pictures in intra mode and ensures that the whole picture is updated after a pre-selected number of pictures. The updating method disseminates compression artifacts throughout the video stream by changing the orientation of the intra-coded regions for every picture and scatters intra-picture compression artifacts by spatially decimating the aforementioned regions at different rates.

58 Claims, 6 Drawing Sheets

US 6,914,939 B1

METHOD AND APPARATUS FOR PRODUCING PSEUDO-CONSTANT BITS PER PICTURE VIDEO BIT-STREAMS FOR LOW-DELAY COMPRESSION SYSTEM

TECHNICAL FIELD

The invention relates generally to the field of digital video compression, and more particularly, to a facility for producing a pseudo-constant bits per picture compressed bitstream in real-time video such as interpersonal or multimedia communications, e.g., video-conferencing or video-telephony, where the end-to-end encoding/decoding delay should be low.

BACKGROUND OF THE INVENTION

Production and transmission of information has undergone drastic changes in recent years. This evolution is mainly due to the availability of reliable and sophisticated digital communications networks, digital storage media, and digital compression specifications which have facilitated emission and management of a wide array of digital assets such as motion video, image, text, audio, data, and graphic information. Motion video due to its widespread application in various chains of digital infrastructures and the abundant information that it carries, has received significant attention from the research and development community. As a result, a number of methods have been developed to deal with encoding of moving pictures at various spatial and temporal sampling rates. These methods are intended to elevate the use of digital video in industry, encourage the enhancements of current products, and finally accelerate the definition of future products.

For example, the MPEG-2 international standard formed by the Moving Pictures and Expert Group, and described in ISO/IEC 13818-2, "Information Technology—Generic Coding of Moving Pictures and Associated Audio Information: Video, 1996," which is hereby incorporated herein by reference in its entirety, adopts the tool-kit approach of "profiles" and "levels" to encompass the need of many factions within the broadcast, consumer, and entertainment sectors. "Profile" defines a subset of tools available to encode a video sequence while "level" deals with spatio-temporal resolution of a video source.

The book by B. G. Haskell, A. Puri, and A. N. Netravali, *Digital Video: An Introduction to MPEG-2*, Chapman and Hall, New York, 1997, which is hereby incorporated herein by reference in its entirety, explains various components of an MPEG-2 encoder in detail. Most digital video encoders rely on some form of an image analyzer, such as Discrete Cosine Transformation (DCT), to exploit intra-picture pixel-to-pixel redundancies, and motion estimation/compensation units to remove the inter-picture pixel-to-pixel redundancies. Since hardware realization of the above image processing techniques are more practical for rectangularly-shaped groups of pixels, the majority of specifications for digital video compression adopt a block-based approach of processing the image data.

A very efficient form of digital video compression is achieved by classifying a plurality of pictures into intra-coded and predicted (or inter-coded) pictures. For an intra-coded picture only the information from the same picture is used to perform the encoding procedure. On the other hand, the image data in inter-coded pictures is predicted by displacing information in other pictures within a defined search area. The concept of searching for the best prediction is known in the art as motion estimation. The difference of the prediction and the picture is then encoded. Therefore, decoding of inter-coded pictures require adding the decoded picture-difference to the displaced picture. The concept of displacing pictures during the decoding procedure is known in the art as motion compensation.

The use of motion estimation and motion compensation methods in inter-coded pictures helps greatly in reducing the amount of consumed bits. For cases where a good prediction is not found for a region of a picture, the encoder can revert back to the intra-coded method to carry out the compression task for this particular region of the picture. An intra versus inter switch can be easily derived for the video encoder. For ease of discussion, intra-coded pictures are referred as I coded and predicted-coded pictures are labeled P coded. The aforementioned description of a digital video encoder is clear with knowledge of the art of video compression. Further it is clear that a predicted picture would consume a lot less number of bits than an intra-coded picture. This methodology, although very efficient for producing professional quality video, requires a large encoder or decoder buffer size and consequently imposes a longer system delay. This is because the large intra-coded pictures of the bit-stream have to fit in the decoder buffer and secondly it takes longer for all the bits of this type picture to be in the buffer. On the other hand I pictures are very useful since they facilitate random accessing and further impose a bound on how long a corrupted region of the picture would leak into the rest of the compressed video stream.

A unique application for any type of digital video encoder is in the area of real-time video communications, where video-conferencing, video-phone, and monitoring compression systems with low encoding/decoding delay can be realized. Such products require a special set of features in order to be practical and cost effective.

SUMMARY OF THE INVENTION

For digital video products where low encoding/decoding delay is of utmost importance, a different encoding strategy should be deployed. This strategy should encourage the use of a small buffer size, which is realized in accordance with the present invention by producing a near-constant bits per picture compressed stream.

The specification in ISO/IEC 13818-2 describes a methodology for low delay encoding applications such as in visual communications. This method recommends that picture updating, which is typically done by inserting I pictures, can be accommodated by only updating a part of the picture. The rest of the picture is predicted. Parts of the picture which are updated use the same encoding scheme as the one in the intra-coded pictures. This mechanism improves the resilience of the stream in the presence of possible byte corruption or bad prediction. Using this methodology it is possible to create a P-only bit-stream, which along with a sophisticated bit-allocation scheme should facilitate the use of a small buffer size. Most specifications and recommendations suggest the updating of a series of pixel blocks from left to right (i.e., across a row of blocks) or from top to bottom (i.e., down a column of blocks) where the updated rows would move from top to bottom and the updated columns would move from left to right as the video is displayed. This approach would ensure that a badly predicted pixel data will not corrupt the rest of the video for ever since it will be updated (intra-coded) within a fixed cycle. However, the above-described compression strategies and prior art dealing with low delay encoding methods do not describe a methodology for producing an almost constant bits per pictures where the source video is moving from one scene to another new scene.

Thus, described herein are a method and apparatus for achieving the requirements of a low delay video encoder. These requirements should guarantee that the actual number of produced bits in a video bit-stream is close to a constant number, specifically when a video shot change is detected, and further, the whole picture is updated without motion estimation within a pre-selected number of pictures. The present invention is readily applicable to any digital video encoder which employs the concept of motion estimation and motion compensation.

Briefly summarized, the present invention comprises in one aspect a method for processing a sequence of video frames. The method includes dynamically encoding the sequence of video frames to produce a pseudo-constant bits per frame compressed signal at a scene change within the sequence of video frames. The dynamically encoding includes: detecting when a new scene occurs in the sequence of video frames; and responsive to the detecting, dynamically determining a group of frequency domain pixel data to be retained for a frame of the new scene.

In another aspect, a method for processing a sequence of video frames is provided which includes dynamically encoding the sequence of video frames, where the dynamically encoding includes: encoding multiple blocks of a first frame of the sequence of video frames in intra-coded mode using a first orientation for the intra-coded blocks; and encoding multiple blocks of a second frame of a sequence of video frames in intra-coded mode using a second orientation for the intra-coded blocks, wherein the first orientation and the second orientation are perpendicular.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The above objects, advantages and features of the present invention will be more readily understood from the following detailed description of certain preferred embodiments of the invention, when considered in conjunction with the accompanying drawings in which:

BEST MODE FOR CARRYING OUT THE INVENTION

The present invention recognizes that the conventional method of picture updating for low delay applications, i.e., the example in ISO/IEC 13818-2, does not provide suitable video quality. This is due to the fact that intra-coded blocks of a picture will always produce less artifacts than predicted blocks, and further, the monotonic way of updating one row or column as if they are rolling downward or sideway, respectively, from picture to picture creates sufficient time for a viewer to comprehend inconsistencies in video quality. This quality variation can be described as a worm-like phenomena which is more easily detected in video sources comprised of lots of image details and a small but constant picture velocity. Under this scenario, the intra-coded rows or columns which consume a large portion of the picture bit-budget are easily identified. Of course, one can minimize the bit-budget of the intra-coded blocks to ensure a more consistent video quality, but this quality sacrifice would jeopardize the reliability of a good reference block for regions of the picture where motion compensation is to be performed.

Therefore, the present invention proposes disseminating the intra-coded blocks in a pseudo-random format within the picture, thereby offering a more consistent video quality than the systematic way of rolling over a series of rows or columns of blocks of pixels. The low delay encoding approach described herein uses an intra versus inter block pattern generating scheme to ensure the whole scene is updated after a fixed pre-defined number of P pictures. Moreover, the formation of the intra-coded blocks are in such a way that the human eye cannot track down the high fidelity regions of a real-time motion video. This is accomplished by forcing the scattered intra-coded blocks to move bidirectionally. The collection of intra-coded blocks undergoes spatio-temporal subsampling. The resultant subsampled grid when overlayed on top of the output from the intra/inter switch of the encoder generates video bit-streams which are significantly better than previous approaches to low delay compression. The approach presented herein does not create a visible discontinuity between intra-coded and predicted blocks of a picture.

The present invention uses modifications to the rate-control algorithm of a digital video encoder to create a pseudo-constant bits per picture stream. This is achieved by assigning the same picture type P and the same number of bits to each picture of the video source. A frequency-domain data management model is implemented for shot changes to ensure that all pictures of the compressed stream are represented with a pseudo-constant number of bits. One embodiment of the invention and how the same number of bits is substantially achieved throughout the video bit-stream is discussed.

Low Delay Encoding Scheme

Figure 1:
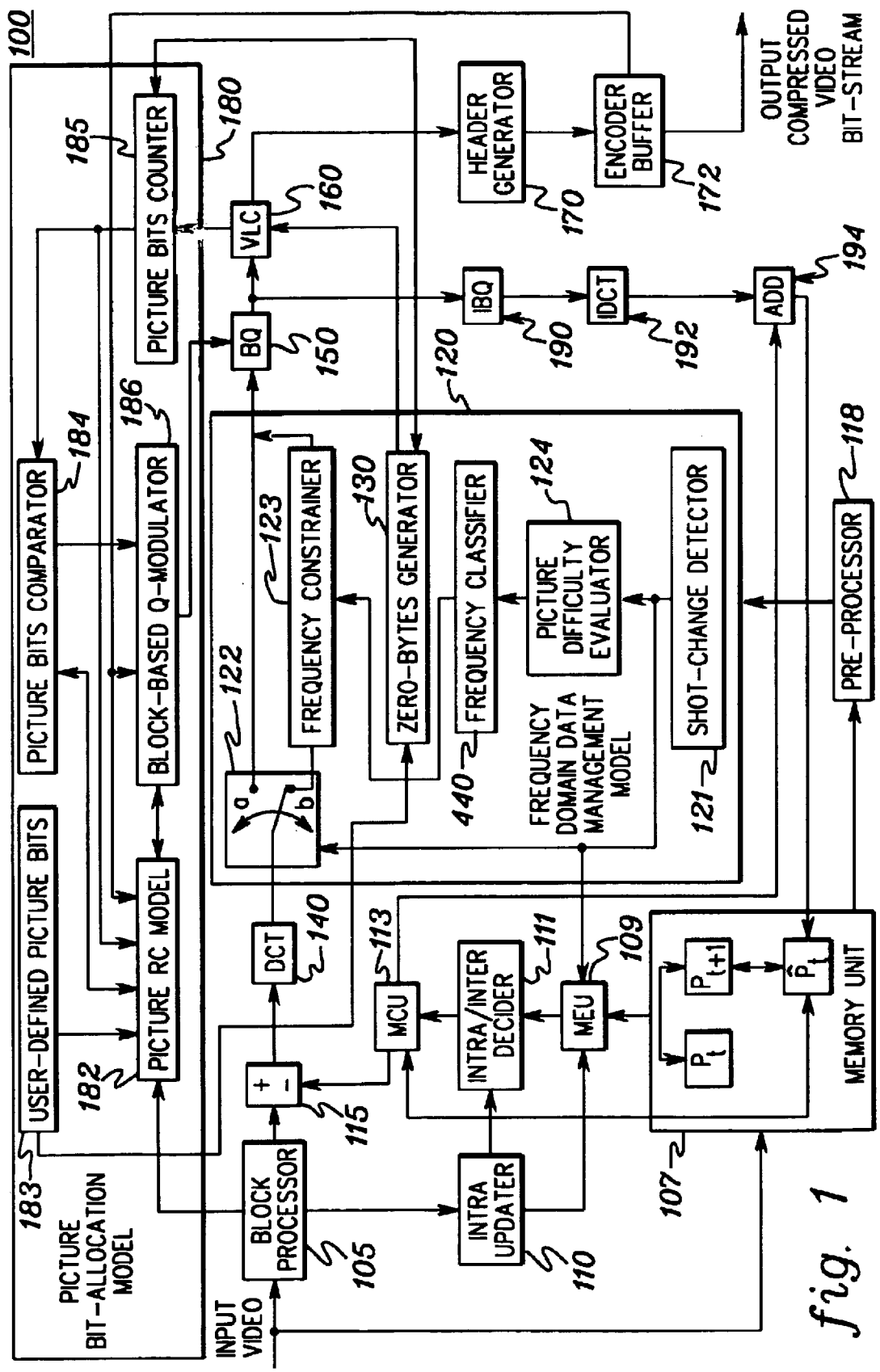
FIG. 1 depicts one embodiment of a low-delay digital encoder incorporating and using a frequency domain data management model for producing pseudo-constant bits per pictures at shot changes and an intra updating model in accordance with the principles of the present invention.

FIG. 1 shows one example of a low delay digital video encoder 100 which includes an intra updater 110 and a frequency domain data management model 120 for generating pseudo-constant bits per picture in accord with the present invention. The intra updater 110 and frequency domain data management model 120 are described in detail further below.

For a generic low delay encoder, intra-coding of a block of pixels is achieved by applying a block-based Discrete Cosine Transformer (DCT) 140, followed by a Block Quantizer (BQ) 150, and then a Variable Length Coder (VLC) 160. The header generation unit 170 is responsible for creating video sequence headers and the necessary start codes which are in compliance with a given video compression standard. The encoder buffer 172 has the responsibility of absorbing the picture-to-picture bit-fluctuations (which should be small for low delay applications) as generated by the VLC unit 160 and outputting a constant bits per picture compressed stream for transmission over a selected channel. Since the encoder buffer 172 is of finite size, special measures have to be accounted for to ensure that buffer overflows or underflows do not occur. This is accomplished by monitoring the content of the buffer and sending this information to a picture Rate-Control (RC) model 182 within a picture bit-allocation model 180. This RC model will then impose certain limits on the picture bits.

An integral part of any video compression engine is the picture bit-allocation model 180 shown in FIG. 1. Based on the desired average bit-rate of the bit-stream, the user defines the actual number of bits 183 assigned to each picture. Since the output of the encoder is a P-only stream, this predetermined number has a constant value. The picture RC model 182 may adjust this selection by compensating for any deviations from the targeted bit-rate. The adjustment factor is derived by comparing the output of the picture bits counter 185 against the target bits assigned by the picture RC model 182 using the picture bits comparator unit 184. Additional adjustments are carried out through a feed-back loop from encoder buffer 172 occupancy. The picture bits counter 185 reads in the number of bits associated with each VLC codeword to obtain the total number of bits for each picture.

The picture RC model 182 takes several statistical measures as inputs. These are an activity measure, outputted by a block processor 105, an actual picture quantization number from the block-based quantizer-modulator (Q-modulator) unit 186, and finally an actual picture bit count from picture bits counter unit 185. These parameters, along with information collected from the encoder buffer fullness and the user-defined picture bits, are used to determine an ideal picture bits number for the next picture to be encoded. The picture RC model 182 will ultimately compute a picture quantization value and input this along with the ideal picture bits to the block-based Q-modulator 186. The role of the block-based Q-modulator 186 is to ensure that the final picture count is close to the target picture bits computed by the picture RC model 182. This task is facilitated by the picture bits comparator unit 184 which computes the difference between the accumulated actual picture count and the properly scaled target picture bits after each block of pixels is encoded. The difference number for the processed blocks along with an encoder buffer 172 occupancy measure are used to modulate the picture quantization value (previously provided by the picture RC model) at the block level. Finally, the block-based Q-modulator unit 186 sends a nominal quantizer value to the BQ unit 150 which will implement the quantization of the image block.

For predicted-coding of a block of pixels, in one embodiment, the present invention employs the components of an intra-picture encoder previously described, plus units such as the motion estimation unit (MEU) and motion compensation unit (MCU). In this mode of operation, two consecutive pictures of the input video, i.e., $P_t$ and $P_{t+1}$, are stored in the memory unit 107. For each block of $P_{t+1}$, a prediction is formed by displacing a block of $P_t$ (having the same coordinates as the block of $P_{t+1}$) within a motion window, and searching for the best match. This process is performed by the MEU 109. It should be noted that a video decoder used to decompress the output of the low delay encoder has only access to the decompressed (or reconstructed) pictures. For example, reconstruction of picture $P_{t+1}$ at the decoder output requires reconstruction of picture $P_t$ which is labeled as $\hat{P}_t$ in memory 107. In order to minimize the drift between the reconstructed pictures at the encoder and decoder sides, consideration should be made to displacing the blocks of $P_t$ at the encoder side. As a result, it is more efficient to perform the motion estimation (ME) task in two steps. In the first step, MEU 109 computes an estimation for each block of $P_{t+1}$ using a block of $P_t$. This estimate is uniquely defined by a set of motion vectors which describe the displacement of the predicted block from its original location in horizontal and vertical directions. In the second step, the motion vectors of the first step are used as an initial guess to displace a block of $\hat{P}_t$ corresponding to a block of $P_{t+1}$, and finally refining it within a motion window to obtain the best prediction for $P_{t+1}$. Therefore, it is required to store the reconstructed picture $\hat{P}_t$ in the memory unit 107.

It is possible that during the ME task, a good prediction cannot be found for a block under consideration and, hence, it is more advantageous to encode the block as intra-coded. This decision is made by an intra/inter decider unit 111. If this unit decides to encode a block in intermode, a block of $P_t$ corresponding to a source block in $P_{t+1}$ is motion-compensated by MCU 113 using the proper motion vectors. The output of MCU is subtracted from the source block in $P_{t+1}$ and the resulting block difference, defined as motion compensated block difference (MCBD), is sent to the DCT unit as a subtraction 115 from the source signal. Since the encoder 100 is also responsible for reconstructing pictures, the MCBD blocks are decoded and added to the output of the MCU unit 113 for forwarding to an adder 194. Decoding is comprised of sending the output of BQ unit 150 to the Inverse Block Quantizer (IBQ) 190 and then to an Inverse DCT (IDCT) unit 192. No MCU task is needed for reconstructing blocks of the picture encoded in intra-coded mode.

1. Frequency Domain Data Management Scheme for Production of Pseudo-Constant Bits Per Pictures at Shot Changes A minimum achievable amount of encode/decode delay in a compression system is strongly related to buffer size designed into the system. An aggressive low delay encoder should have a very small buffer size. For a steady-state motion video where transient changes are minimal, this goal is easily achievable. However, if there are sudden changes in the transient behavior of the input video (e.g., a shot change), or if the user decides to input a different source (e.g., change a channel in real-time), a small buffer size will have trouble dealing with large compressed pictures. In this case the decoder buffer will underflow (i.e., overflow condition for encoder buffer). If the compressed picture is too small, the decoder buffer will overflow (i.e., underflow condition for the encoder buffer). In order to circumvent such scenarios, a unique data management model in frequency domain 120 (FIG. 1) is presented herein for cases where there are abrupt changes in transient behavior of input video. This model removes any glitches in the perceived video that are otherwise caused by buffer overflow or underflow of prior low delay encoders at shot (i.e., scene) changes. The components of a frequency domain data management model in accordance with one embodiment of the present invention are described below. This frequency domain data management model is geared toward production of pseudo-constant bits per picture compressed bit-streams in the presence of any form of shot changes.

1.1 Shot-Change Detector

There are many methods of detecting a shot-change in an incoming video stream. One method is to compare the mean of luminance and chrominance components of two consecutive pictures $P_t$ and $P_{t+1}$ to examine if $P_{t+1}$ belongs to a new scene. Let $y_t(i,j), cb_t(i,j)$, and $cr_t(i,j)$ represent the pixel intensities of a YCbCr digital picture at time t and coordinate (i,j), wherein i and j represent the row and column indices, respectively. If $m=m_r \times m_c$ is the number of pixels in the luminance component Y of a picture, then the luminance picture mean would be $\bar{y}_t = m^{-1} \sum_{i=0}^{m_r-1} \sum_{j=0}^{m_c-1} y_t(i,j)$. The number of rows and columns of Y are defined by $m_r$ and $m_c$, respectively. Similarly one can compute the chrominance picture mean for component Cb as $\bar{cb}_t = n^{-1} \sum_{i=0}^{n_r-1} \sum_{j=0}^{n_c-1} cb_t(i,j)$, and for component Cr as $\bar{cr}_t = n^{-1} \sum_{i=0}^{n_r-1} \sum_{j=0}^{n_c-1} cr_t(i,j)$ with $n=n_r \times n_c$ being the number of pixels in the chrominance components, $n_r$ and $n_c$ are the number of rows and columns for a color component, respectively. The three picture means are computed by the pre-processor 118 of FIG. 1 and sent to the shot-change detector unit 121. The shot-change detector 121 will compute an indicator SCI as $$SCI = (a_1 + a_2 a_3)^{-1}(a_1|\bar{y}_{t+1} - \bar{y}_t| + a_2|\bar{cb}_{t+1} - \bar{cb}_t| + a_3|\bar{cr}_{t+1} - \bar{cr}_t|)$$

A typical value for $a_1$ is 2.0, and for $a_2$ and $a_3$ one can use 1.0. The shot-change detector unit will then decide if a shot change is detected by comparing the value of SCI against a pre-determined number (for example, a threshold (Th) of Th=10.0). If SCI>Th, a shot-change is declared and a signal is sent to the MEU unit 109. The MEU will inform the intra/inter decider 111 that the whole picture is encoded in intra-coded mode. Shot-change detector 121 will also send a signal to a bi-state switch 122 which would toggle between frequency-constraining and non-constraining modes. When a shot change is detected, the frequency-domain data management model 120 is informed that for this picture frequency-constraining 123 is required and the switch is subsequently flipped to a "b" position. For normal video, i.e., no presence of shot changes, the bi-state switch is in "a" position. It should be noted that the very first picture of a video source is always treated as a shot change and its encoding task follows the same rules applied to pictures that are declared as new scenes within the stream.

1.2 Picture Difficulty Evaluator

When a shot-change is detected, the difficulty of the picture in the new scene is evaluated by assessing a set of picture-based statistical measures. A picture is defined as being difficult if it is composed of lots of dissimilar image structures. Examples of image structures are textures, edges, spatial details, and color bursts. A picture with many local image structures will yield frequency coefficients which are oriented in different directions and have modest to large amplitudes upon DCT implementation. Therefore, many VLC codewords are required to represent the picture in compressed format which in turn will use a large amount of bits. Such a large picture may not fit in the encoder or the decoder buffer. On the other hand, the least difficult picture will have few fine details, if any. For this picture, the degree of sharpness in edges or the intensity in colors are significantly reduced.

In the present invention, the pre-processor 118 of FIG. 1 will perform a set of inter-pixel calculations on an input picture $P_t$. These calculations are carried out in four directions: horizontal, vertical, southwest to northeast diagonal, and southeast to northwest diagonal. Since picture $P_t$ can be interlaced or progressive in nature, all inter-pixel calculations have to be done for both picture formats. The syntax of most digital video encoders permits the compression to be implemented in interlaced or progressive input mode. Further, pixel processing of an interlaced picture (which is composed of two fields), can be done in frame or field format. This is typically referred to as frame or field encoding and is obvious to someone who is familiar with the art of digital video compression. Further, it should be obvious that an interlaced frame is comprised of two interleaved fields sampled at different times. Therefore, if an interlaced frame is decomposed into two fields, two pictures in field formats having half the resolution of the interlaced frame are formed.

For purposes of discussion, the following definitions apply: the frame-based horizontal inter-pixel differences is defined as $Z_h$, frame-based vertical inter-pixel differences as $Z_{F,v}$, frame-based 45° diagonal inter-pixel differences as $Z_{F,d45}$, and frame-based 135° diagonal inter-pixel differences as $Z_{F,d135}$. The field-based inter-pixel differences for horizontal, vertical, 45° diagonal, and 135° diagonal are defined as $Z_h$, $Z_{f,v}$, $Z_{f,d45}$, and $Z_{f,d135}$, respectively. It should be noted that for either frame or field processing, the task of horizontal inter-pixel differencing remains in tact since pixel data in the same memory locations will be fetched. For frame encoding mode of an interlaced picture, statistical measures are performed on both frame and field formats and a set of inter-pixel indicators are fed to the picture difficulty evaluator 124 of FIG. 2. For encoding of progressive pictures, all inter-pixel indicators are frame-based. For both progressive and interlaced sources, picture $P_t$ is stored in the memory unit 107 of FIG. 1 in a frame format. Parameter $Z_h$ for picture $P_t$ is calculated as:

$$Z_h = (g_1 + g_2 + g_3)^{-1} \left( (m - m_r)^{-1} \sum_{i=0}^{m_r-1} \sum_{j=0}^{m_c-2} g_1 |y_t(i, j) - y_t(i, j+1)| + (n - n_r)^{-1} \sum_{i=0}^{n_r-1} \sum_{j=0}^{n_c-2} g_2 |cb_t(i, j) - cb_t(i, j+1)| + (n - n_r)^{-1} \sum_{i=0}^{n_r-1} \sum_{j=0}^{n_c-2} g_3 |cr_t(i, j) - cr_t(i, j+1)| \right) \quad (2)$$

Other frame-based statistical measures for either interlaced or progressive pictures are calculated as:

$$Z_{F,v} = (g_1 + g_2 + g_3)^{-1} \left( (m - m_c)^{-1} \sum_{j=0}^{m_c-1} \sum_{i=0}^{m_r-2} g_1 |y_t(i, j) - y_t(i+1, j)| + (n - n_c)^{-1} \sum_{j=0}^{n_c-1} \sum_{i=0}^{n_r-2} g_2 |cb_t(i, j) - cb_t(i+1, j)| + (n - n_c)^{-1} \sum_{j=0}^{n_c-1} \sum_{i=0}^{n_r-2} g_3 |cr_t(i, j) - cr_t(i+1, j)| \right) \quad (3)$$

$$Z_{F,d45} = (g_1+g_2+g_3)^{-1}\bigg((m_r-1)^{-1}(m_c- \qquad (4)$$
$$1)^{-1}\sum_{i=1}^{m_r-1}\sum_{j=0}^{m_c-2}g_1|y_t(i,j)-y_t(i-1,j+1)|+$$
$$(n_r-1)^{-1}(n_c-1)^{-1}\sum_{i=1}^{n_r-1}\sum_{j=0}^{n_c-2}g_2|cb_t(i,j)-cb_t(i-$$
$$j,j+1)|+(n_r-1)^{-1}(n_c-1)^{-1}\sum_{i=1}^{n_r-1}\sum_{j=0}^{n_c-2}g_3|cr_t(i,j)-cr_t(i-$$
$$1,j+1)|\bigg)$$

$$Z_{F,d135} = (g_1+g_2+g_3)^{-1}\bigg((m_r-1)^{-1}(m_c- \qquad (5)$$
$$1)^{-1}\bigg(\sum_{i=0}^{m_r-2}\sum_{j=0}^{m_c-2}g_1|y_t(i,j)-y_t(i+1,j+1)|+$$
$$(n_r-1)^{-1}(n_c-1)^{-1}\sum_{i=0}^{n_r-2}\sum_{j=0}^{n_c-2}g_2|cb_t(i,j)-$$
$$cb_t(i+1,j+1)|+(n_r-1)^{-1}(n_c-1)^{-1}\sum_{i=0}^{n_r-2}\sum_{j=0}^{n_c-2}g_3|cr_t(i,j)-$$
$$cr_t(i+1,j+1)|\bigg)$$

Field-based statistical measures for interlaced pictures, where frame encoding mode is considered, are calculated as:

$$Z_{f,v} = \frac{f_1 Z_{f,v}^{top} + f_2 Z_{f,v}^{bot}}{f_1 + f_2} \qquad (6)$$

$$Z_{f,d45} = \frac{f_1 Z_{f,d45}^{top} + f_2 Z_{f,d45}^{bot}}{f_1 + f_2} \qquad (7)$$

$$Z_{f,d135} = \frac{f_1 Z_{f,d135}^{top} + f_2 Z_{f,d135}^{bot}}{f_1 + f_2} \qquad (8)$$

with $f_1=1.0$ and $f_2=1.0$, and top and bot representing top and bottom fields of an interlaced frame, respectively. Each line of the top field of an interlaced frame is spatially located above a line of the bottom field of the same frame. Components of equations (6), (7) and (8) can be computed as:

$$Z_{f,v}^x = (g_1+g_2+g_3)^{-1}\bigg((m/2-m_c)^{-1}\sum_{j=0}^{m_c-1}\sum_{i=0}^{m_r/2-2}g_1|y_t(2i+ \qquad (9)$$
$$o_x,j)-y_t(2(i+1)+o_x,j)|+$$
$$(n/2-n_c)^{-1}\sum_{j=0}^{n_c-1}\sum_{i=0}^{n_r/2-2}g_2|cb_t(2i+o_x,j)-$$
$$cb_t(2(i+1)+o_x,j)|+(n/2-n_c)^{-1}\sum_{j=0}^{n_c-1}\sum_{i=0}^{n_r/2-2}g_3|cr_t(2i+$$
$$o_x,j)-cr_t(2(i+1)+o_x,j)|\bigg)$$

$$Z_{f,d45}^x = (g_1+g_2+g_3)^{-1}\times\bigg((m_r/2-1)^{-1}(m_c- \qquad (10)$$
$$1)^{-1}\sum_{i=1}^{m_r/2-1}\sum_{j=0}^{m_c-2}g_1|y_t(2i+o_x,j)-y_t(2(i-1)+$$
$$o_x,j+1)|+(n_r/2-1)^{-1}(n_c-$$
$$1)^{-1}\sum_{i=1}^{n_r/2-1}\sum_{j=0}^{n_c-2}g_2|cb_t(2i+o_x,j)-$$
$$cb_t(2(i-1)+o_x,j+1)|+(n_r/2-$$
$$1)^{-1}(n_c-1)^{-1}\sum_{i=1}^{n_r/2-1}\sum_{j=0}^{n_c-2}g_3|cr_t(2i+o_x,j)-$$
$$cr_t(2(i-1)+o_x,j+1)|\bigg)$$

$$Z_{f,d135}^x = (g_1+g_2+g_3)^{-1}\times\bigg((m_r/2-1)^{-1}(m_c- \qquad (11)$$
$$1)^{-1}\sum_{i=0}^{m_r/2-2}\sum_{j=0}^{m_c-2}g_1|y_t(2i+o_x,j)-y_t(2(i+1)+$$
$$o_x,j+1)|+(n_r/2-1)^{-1}(n_c-$$
$$1)^{-1}\sum_{i=0}^{n_r/2-2}\sum_{j=0}^{n_c-2}g_2|cb_t(2i+o_x,j)-cb_t(2(i+1)+$$
$$o_x,j+1)|+n_r/2-1)^{-1}(n_c-$$
$$1)^{-1}\sum_{i=0}^{n_r/2-2}\sum_{j=0}^{n_c-2}g_3|cr_t(2i+o_x,j)-cr_t(2(i+1)+$$
$$o_x,j+1)|\bigg)$$

where x represents the type of field, i.e., top or bot, and for x=top, $0_x=0_{top}=0$ and for x=bot, $0_x=0_{bot}=1$. For the case where the encoder is set in the field encoding mode, each picture is stored in the memory unit of FIG. 1 as a field. In this case, all inter-pixel statistical measures are computed using equations (2), (3), (4), and (5) with $m_r$ and $n_r$ taking on the field resolutions for luminance and chrominance components, respectively. Finally, an example for values of gs are: $g_1=2.0$, $g_2=1.0$, and $g_3=1.0$.

Figure 2:
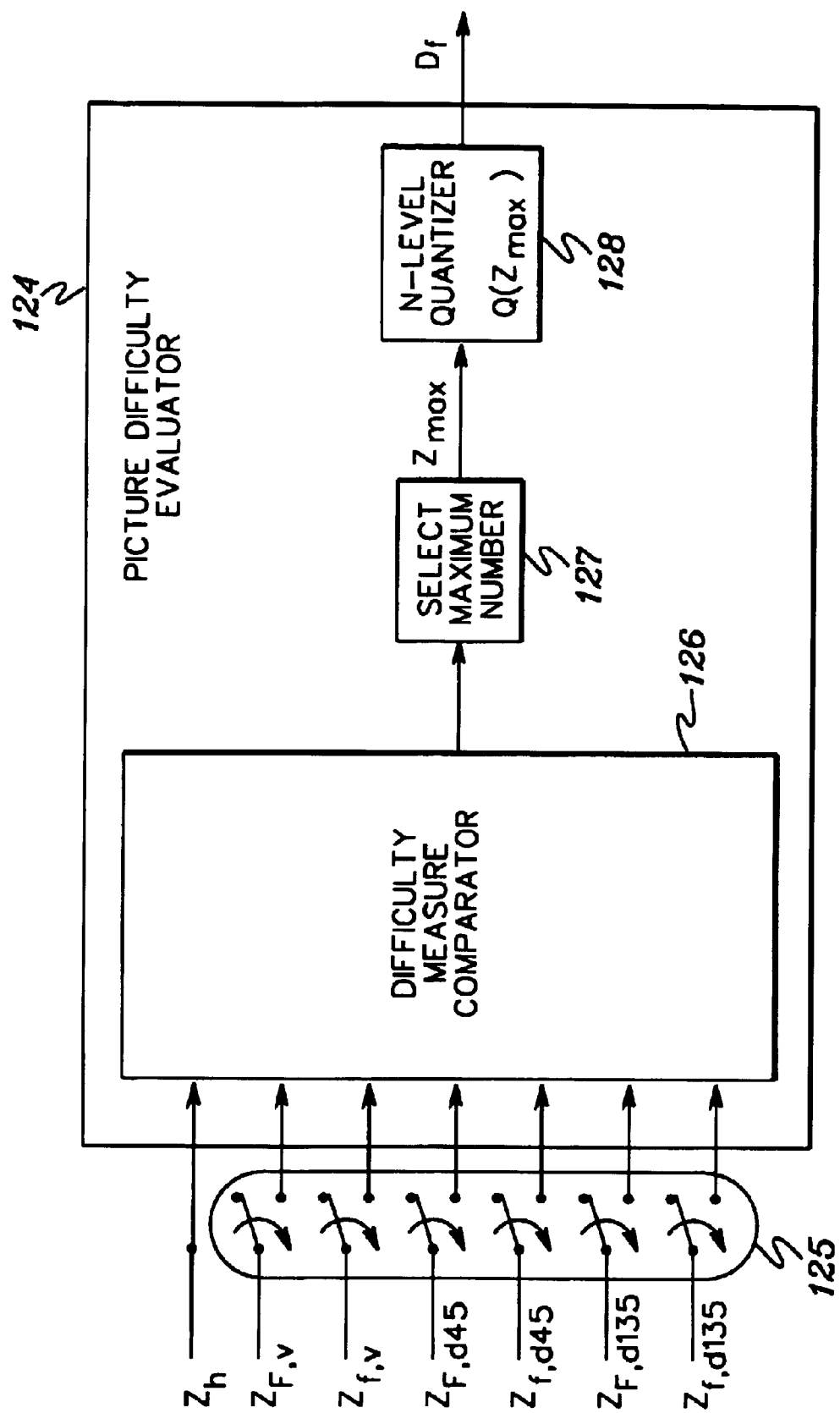
FIG. 2 depicts one embodiment of a picture difficulty evaluator in accordance with the present invention.

In accordance with one embodiment of the present invention, a set of picture-based statistical measures ($Z_h$, $Z_{F,v}$, $Z_{f,v}$, $Z_{F,d45}$, $Z_{f,d45}$, $Z_{F,d135}$ and $Z_{f,d135}$) are fed to the picture difficulty evaluator 124 of FIG. 2. Depending on the encoder's mode of operation or the nature of the input source, a sub-set of statistical indicators are computed and sent to the difficulty measure comparator. For example, if the user knows the source is progressive, only $Z_h$, $Z_{F,v}$, $Z_{F,d45}$, and $Z_{F,d135}$ are calculated with the proper frame resolutions, and all switches 125 corresponding to these indicators are turned on in FIG. 2. If the source is interlaced and the user sets the encoder in field encoding mode, again the indicators $Z_h$, $Z_{F,v}$, $Z_{F,d45}$, and $Z_{F,d135}$ are calculated, this time with field resolutions. For the aforementioned cases a final statistical measure $Z_{max}$ is obtained by a difficulty measure comparator 126 such that:

$$Z_{max} = \text{MAX}(Z_h, Z_{F,v}, Z_{F,d45}, Z_{F,d135}) \qquad (12)$$

If the user sets the encoder for frame encoding mode of an interlaced source, all seven inputs to picture difficulty evaluator of FIG. 2 are present and computed, i.e., $Z_h$, $Z_{F,v}$, $Z_{f,v}$, $Z_{F,d45}$, $Z_{f,d45}$, $Z_{F,d135}$, and $Z_{f,d135}$. This means that all switches 125 to picture difficulty evaluator 124 of FIG. 2 are now turned on. In this case, $Z_{max}$ is obtained by select maximum number logic 127 as:

$$Z_{max}=MAX(Z_h,\min(Z_{F,v},Z_{f,v}),\min(Z_{F,d45},Z_{f,d45}),\min(Z_{F,d135},Z_{f,d135}))$$

Figure 3:
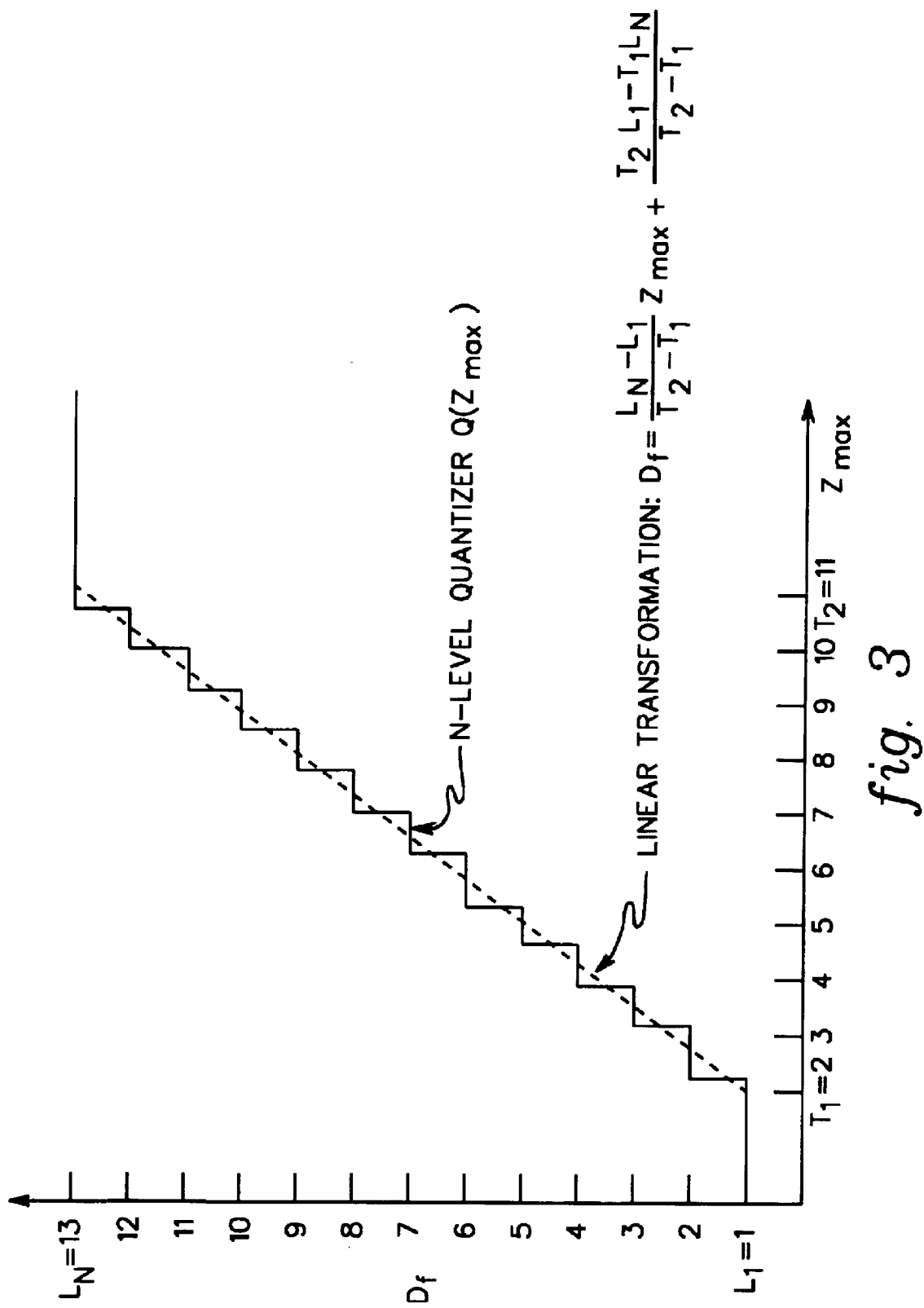
FIG. 3 is a graph of one embodiment of an N-level quantizer for the picture difficulty indicator of FIG. 2, in accordance with the principles of the present invention.

Parameter $Z_{max}$ indicates how difficult a picture is and further, the most difficult pictures (example, large $Z_{max}$ values) will likely consume the most amount of bits. Considering a broad class of video sequences, $Z_{max}$ can potentially possess a wide range. In order to classify every video shot, a mapping technique is employed which forms a dependency between the picture-based statistical measure $Z_{max}$ and a level of encoding difficulty. The number of levels are finite, and therefore, every possible value of $Z_{max}$ can be mapped into a level. The mapping function is defined by the N-level quantizer $Q(Z_{max})$ 128 and incorporate this into the picture difficulty evaluator 124 of FIG. 2. One embodiment of the mechanism of the N-level quantizer 128 is depicted in FIG. 3. Every value of $Z_{max}$ is fed to the N-level quantizer and a parameter defined as $D_f$ is provided (see FIG. 2) as output. As one example, a value of N=13 is used for the $Q(Z_{max})$ quantizer of FIG. 3, but any number of levels greater than or equal to two could be derived for N in accordance with the present invention.

The quantizer of FIG. 3 will operate on $Z_{max}$ and compute $D_f$ through $$D_f = \begin{cases} L_N & \text{if } Z_{max} \geq T_2 \\ L_1 & \text{if } Z_{max} \leq T_1 \\ INT\left(\dfrac{L_N - L_1}{T_2 - T_1}Z_{max} + \dfrac{T_2 L_1 - T_1 L_N}{T_2 - T_1} + \dfrac{1}{1+a}\right) & \text{otherwise} \end{cases} \quad (14)$$

Where INT(.) denotes the largest integer number which is smaller than the argument of the function. Threshold parameters of equation (14) are $T_1=2$ and $T_2=11$ and the limits on levels $L_1 =1$, $L_N=13$. Parameter $(1+a)^{-1}$ controls the positions of the centroids of step sizes of the quantizer function along the $Z_{max}$ axis. A large value for this parameter will shift the centroids to the left and a smaller value will have an opposite impact. The quantizer of FIG. 3 is drawn with a=1. This means that we are more biased toward declaring pictures as difficult. Finally, the dashed line of FIG. 3 is a representation of the argument of the INT(.) function with no adjusting parameter $(1+a)^{-1}$.

1.3 Frequency Classifier

Figure 4:
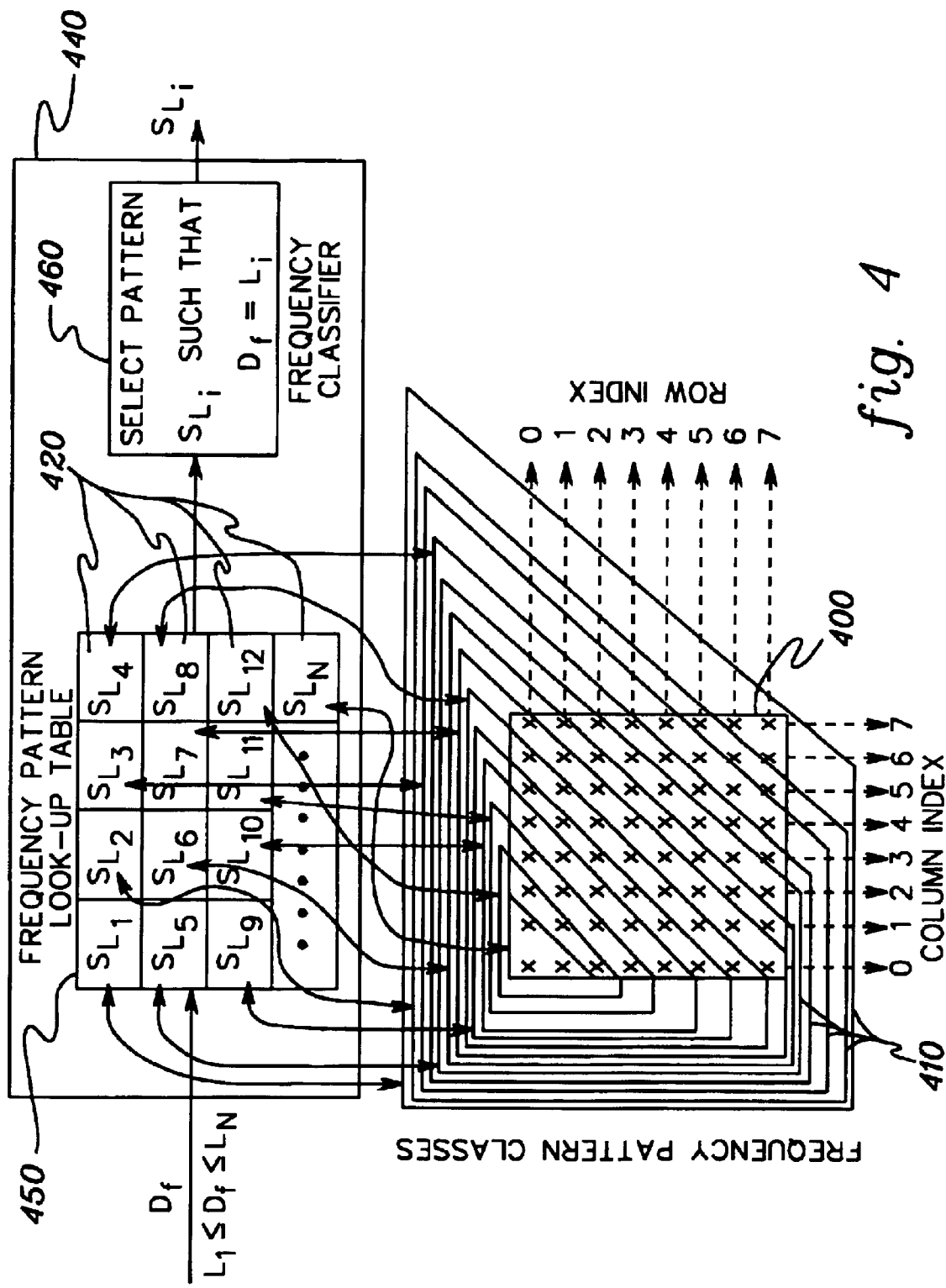
FIG. 4 depicts one embodiment of a frequency classifier and its frequency pattern classes, in accordance with the principles of the present invention.

FIG. 4 displays one possible way of partitioning the frequency coefficients of an 8×8 DCT block 400 of a picture into different pattern classes 410. Since the coefficients are oriented such that their significance decreases from left to right and top to bottom, the partitioning strategy should favor the most significant values located near the top left of the 8×8 block 400 and other classes are formed by expanding into the next set of coefficients. The approach of FIG. 4 uses 13 pattern classes 420 and each class takes the shape of a right-angle triangle. Other number of pattern classes or other formations such as squares or rectangles or any other shape could be used in accordance with the present invention.

Difficulty measure $D_f$ is sent to the frequency classifier 440 of FIG. 4 and matched against a look-up table 450. The look-up table has a number of frequency pattern classes 420 in store. A pattern $S_{L_i}$ is selected 460 by the frequency classifier 440 such that $D_f=L_i$. Pattern classes are indexed so that the lowest order class is associated with the least difficult picture (example, $D_f=L_1$), and will carry more DCT coefficients throughout the encoding procedure than the most difficult picture (example, $D_f=L_N$) corresponding to the highest order class.

1.4 Frequency Constrainer

Figure 5:
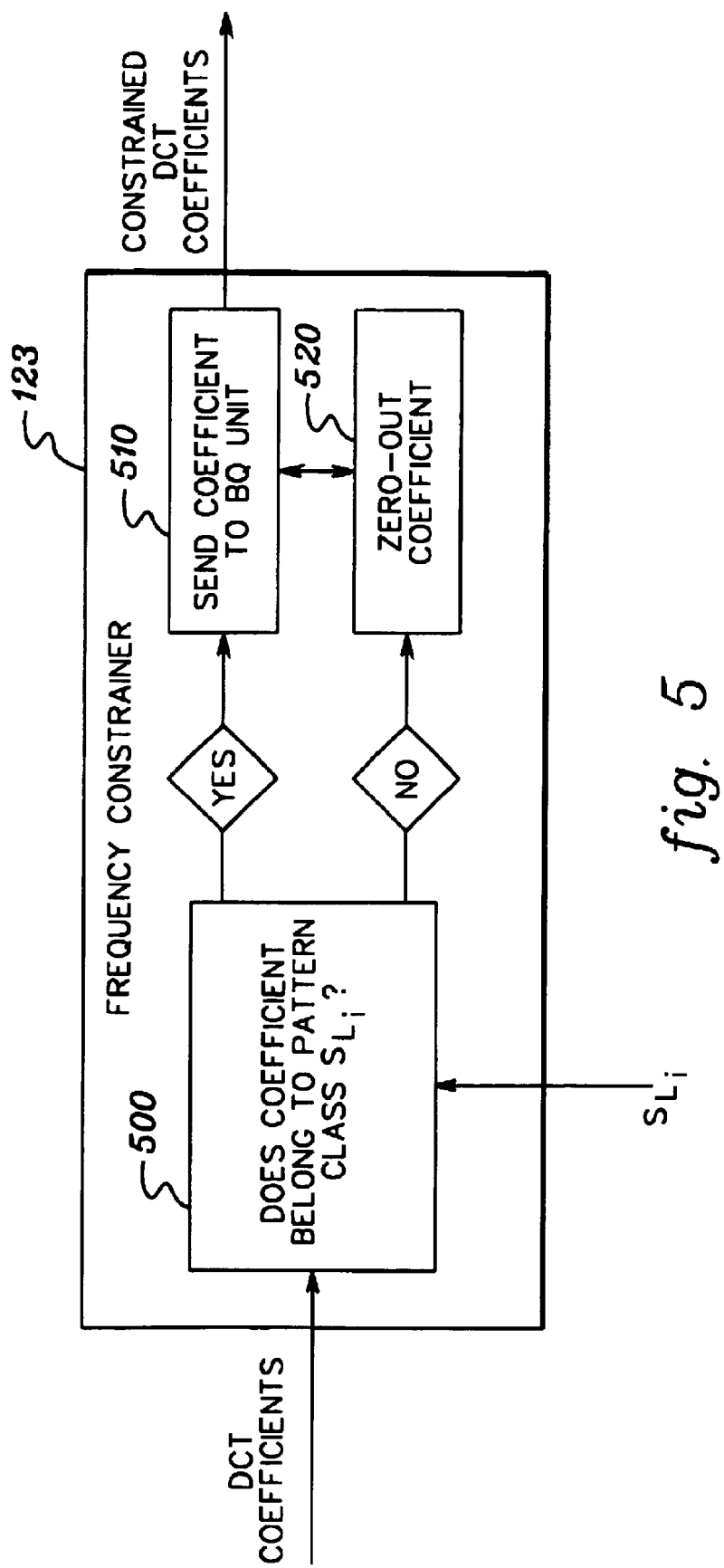
FIG. 5 depicts one embodiment of a frequency constrainer in accordance with the principles of the present invention.

The selected pattern $S_{L_i}$ along with the DCT coefficients are sent to the frequency constrainer 123 of FIG. 5 after a scene change is detected (switch 122 of FIG. 1 is in "b" position). If the coefficients belong to the set $S_{L_i}$, they will be kept 510, otherwise they will be discarded 520. Therefore, a constrained set of DCT coefficients is passed through the frequency constrainer 123 and fed to the BQ unit 150 (FIG. 1) for quantization. Such a difficult picture can yield many number of bits in compressed form, a chosen pattern such as $S_{L_{12}}$ Or $S_{L_{11}}$ leads to an aggressive frequency constraining which in turn contributes to providing a pseudo-constant bits per picture video bit-stream. If the encoder does not use any constraining mechanism, difficult pictures would cause the decoder buffer to underflow.

1.5 Zero-Bytes Generator

For some shot-changes, where the new scene is composed of very easy material such as black or grey pictures, the use of the most conservative frequency pattern classes may not result in compressed picture sizes which are close to the nominal value of the user-defined average picture bits $R_a$ of the bit-stream. For these scenarios, a zero-byte generation mechanism is adopted to circumvent the decoder buffer from overflowing. After the final picture count, the actual value of picture bits $R_r$ is supplemented with a number of zero bytes equivalent to:

$$R_z=(R_a-g_d)-R_r \quad (15)$$

The nominal values of $R_a$ and $R_r$ are fed to the zero-byte generator 130 of the frequency domain data management model of FIG. 1 and $R_z$ zero bytes are computed according to equation (15) and sent to the VLC unit 160. Zero bytes are stuffed at the end of the picture in the compressed bit-stream. Constant value $g_d$ is a user-defined number to control the number of zero bytes. A user with a large tolerance for picture bits fluctuations in low delay mode of operation may wish to use a larger $g_d$. For applications where fluctuations are not tolerated, $g_d$ should be zero. A typical value for most applications is $g_d$=64 bits.

2.3. Intra Updater

The intra updater 110 (FIG. 1) of the present invention adopts a unique approach to block coding in intra mode which is different than prior attempts to updating regions of pictures. Most of the art related to low delay encoding employs a systematic way of sweeping through the pictures of the input video. Here, it is guaranteed that the whole picture is updated by unidirectionally moving large blocks of intra-coded pixels. This approach, although simple and easy to implement, introduces a disturbing effect in the quality of the video stream. The intra-coded image blocks are viewed as if they are raised out of the surface of the video screen. This discontinuity phenomena, caused by not uniformly distributing block artifacts, is easily witnessed by a viewer.

The approach of the present invention to intra updating uses a mechanism to disseminate blocks of intra-coded pixels throughout the picture and thereby provides a more feasible approach to uniform distribution of compression artifacts. Further, the orientation of scattered intra-coded blocks is changed herein for every picture to minimize the impact of the encoding distortions. This results in alternating between blocks oriented in the northwest-southeast directions and blocks oriented in the northeast-southwest direction which move in opposite directions. Each orientation is composed of two classes of decimated diagonal intra-coded blocks which are equally spaced along a path perpendicular to their orientation and cover the surface of the picture.

Figure 6:
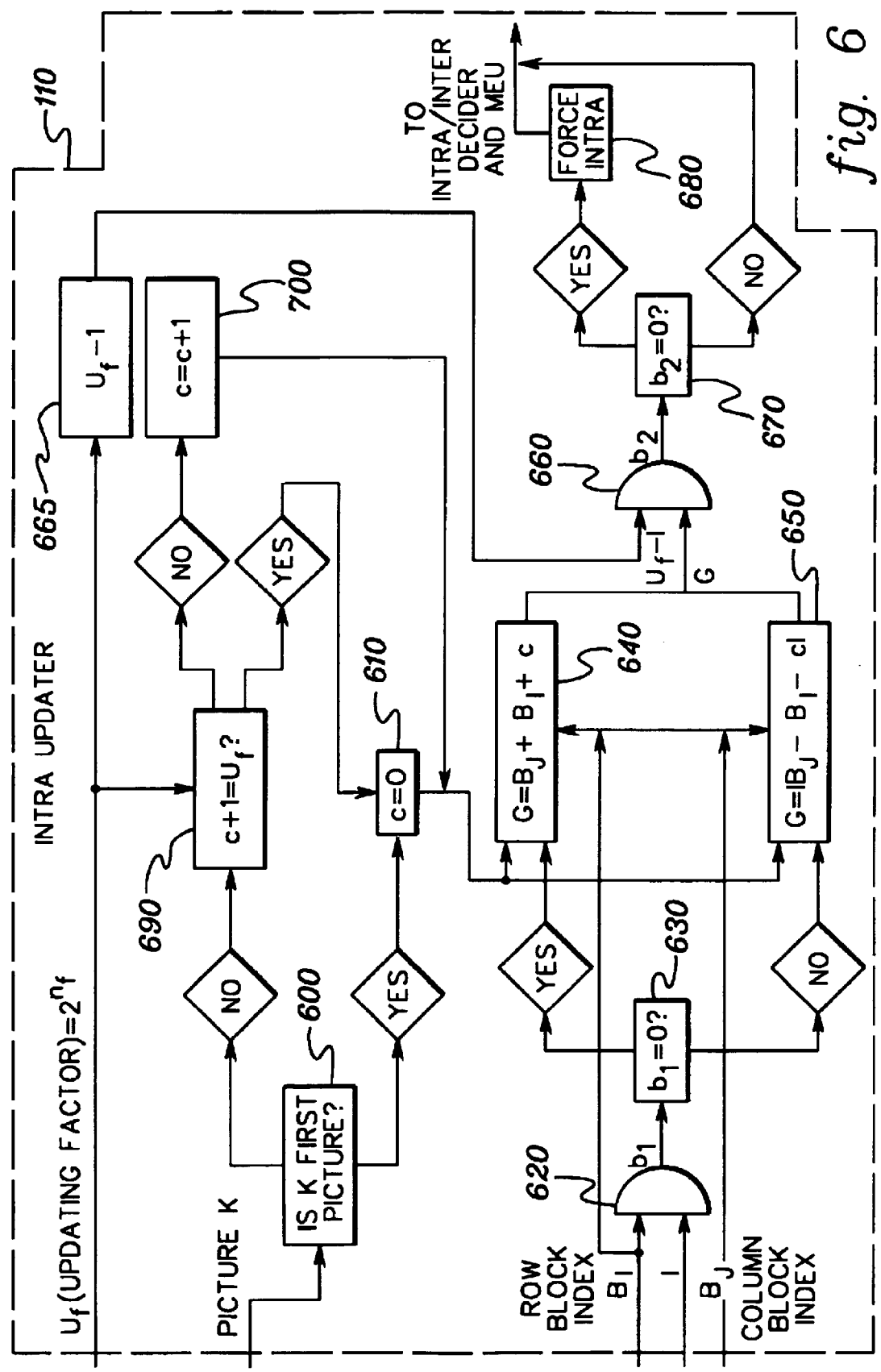
FIG. 6 depicts one embodiment of logic associated with one example of disseminating intra-coded blocks of pixels throughout a video stream in a pseudo-random fashion in accordance with one aspect of the present invention.

FIG. 6 shows one embodiment of an intra updater where after $2^{n_t}$ number of pictures, the whole picture is updated using a block-based intra-coding approach. The block processor 105 of FIG. 1 provides updating parameter $U_f=2^{n_t}$, picture number K, row block index $B_I$, and column block index $B_J$ to intra updater 110 of FIG. 6. If K represents the first picture 600, a cycle counter 610 defined as c is set at zero to denote the beginning of a cycle. A binary representation of $B_I$ is AND gated 620 with 1 and the output is defined as $b_1$. If $B_I$ indicates 630 an even row of the picture (example, output of AND gate is $b_1=0$), then a block address G is computed 640 as:

$$G=B_j+B_l+c \qquad (16)$$

otherwise, for an odd row of the picture (example, $b_1 \neq 0$), G is computed 650 as:

$$G=|B_j-B_l-c| \qquad (17)$$

Binary representations of G and $U_f-1$ 665 are AND gated 660 and output $b_2$ is compared 670 with zero. If the result is zero, i.e., G is a multiple of $U_f$, then the block under process is declared an intra block 680 and the information is sent to the intra/inter decider 111 and MEU units 109 of FIG. 1. Otherwise, the intra/inter decider 111 will determine the modality of the encoded block. For cases where K is not the first picture, it will be examined to see if the picture is within the cycle of updating or not. This is done by testing the equality $c+1=U_f$ 690. If the equality condition holds true, one whole cycle is processed and counter c is re-set to zero 610 denoting that a new cycle is about to begin. Otherwise counter c is incremented by one 700. For both cases c is fed to the block that computes the address G.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for processing a sequence of video frames, said method comprising:
dynamically encoding said sequence of video frames to produce a pseudo-constant bits per frame compressed signal at a scene change within said sequence of video frames, said dynamically encoding comprising:
detecting when a new scene occurs in the sequence of video frames; and
responsive to said detecting, dynamically determining a group of frequency domain pixel data to be retained for a frame of the new scene using a frequency domain data management model.

2. A method for processing a sequence of video frames, said method comprising:
dynamically encoding said sequence of video frames to produce a pseudo-constant bits per frame compressed signal at a scene change within said sequence of video frames, said dynamically encoding comprising:
detecting when a new scene occurs in the sequence of video frames;
responsive to said detecting, dynamically determining a group of frequency domain pixel data to be retained for a frame of the new scene; and
wherein said dynamically determining comprises determining a level of frequency domain pixel data to be retained from multiple predefined levels, and wherein said determining determines the level of frequency domain pixel data to be retained for an initial frame of the new scene.

3. The method of claim 2, wherein said level of frequency data to be retained is associated with a frequency constraining pattern, and said determining comprises selecting a frequency constraining pattern to be employed from a plurality of frequency constraining patterns associated with said multiple predefined levels.

4. The method of claim 3, wherein said plurality of frequency patterns comprise a common geometrical shape, and wherein said common geometrical shape of said plurality of frequency patterns can be one of a plurality of common geometrical shapes.

5. The method of claim 3, wherein at least one most significant frequency pixel is included by each of the plurality of frequency constraining patterns.

6. The method of claim 1, wherein said dynamically determining comprises determining said group of frequency domain pixel data to be retained for said frame of the new scene by evaluating picture difficulty of the new scene.

7. A method for processing a sequence of video frames, said method comprising:
dynamically encoding said sequence of video frames to produce a pseudo-constant bits per frame compressed signal at a scene chance within said sequence of video frames, said dynamically encoding comprising:
detecting when a new scene occurs in the sequence of video frames;
responsive to said detecting, dynamically determining a group of frequency domain pixel data to be retained for a frame of the new scene;
wherein said dynamically determining comprises determining said group of frequency domain pixel data to be retained for said frame of the new scene by evaluating picture difficulty of the new scene; and
wherein said dynamically determining further comprises ascertaining picture difficulty indicators representative of picture difficulty of the new scene, wherein said picture difficulty indicators are ascertained by computing pixel-to-pixel differences in at least some of horizontal, vertical, and diagonal directions.

8. The method of claim 7, wherein said picture difficulty indicators are ascertained by computing pixel-to-pixel differences in each of said horizontal, vertical, and diagonal directions.

9. The method of claim 7, wherein said ascertaining comprises determining a maximum indicator for a frame picture of a progressive video source or a field picture of an interlaced video source, said maximum indicator being determined by comparing, said picture difficulty indicators to each other.

10. The method of claim 7, wherein said ascertaining comprises ascertaining picture difficulty indicators in vertical and diagonal directions for both top and bottom fields of a frame of an interlaced video source, and picture difficulty indicators in vertical and diagonal directions for the frame of the interlaced video source, and wherein said ascertaining further comprises ascertaining field-based indicators in vertical and diagonal directions by computing a weighted summation of individual top and bottom field indicators having a same direction, and wherein for each vertical and diagonal direction, a picture difficulty indicator is determined by ascertaining a minimum number between a corresponding field-based indicator and a frame-based indicator derived from the same frame of the interlaced video source.

11. The method of claim 10, wherein said ascertaining comprises selecting said picture difficulty indicators by determining a maximum indicator of the ascertained vertical and diagonal indicators, as well as a horizontal indicator.

12. The method of claim 9, wherein said ascertaining further comprises mapping the maximum indicator to a level of an n-level quantizer if the value of the maximum indicator is between predefined thresholds, and mapping the maximum indicator to a constant number if the indicator is outside of said predefined thresholds.

13. The method of claim 12, further comprising employing said mapping to identify an address of a frequency pattern in a look-up table, said look-up table containing a plurality of frequency patterns, and wherein said determining comprises selecting one frequency pattern of said plurality of frequency patterns.

14. The method of claim 13, wherein when the maximum indicator has a large nominal value it is re-mapped into a frequency pattern comprising a lesser number of frequency coefficients than a number of coefficients of a frequency pattern corresponding to when the maximum indicator has a smaller nominal value.

15. The method of claim 14, wherein said plurality of frequency patterns are indexed such that a population of one frequency pattern is a subset of a population of a frequency pattern with a lower index number.

16. The method of claim 14, wherein said determining comprises comparing each frequency coefficient of a block with respect to said selected frequency pattern, and if the coefficient belongs to the frequency pattern, the coefficient is retained as part of said group of frequency domain pixel data.

17. The method of claim 1, wherein after a final frame count, if the actual frame bits is smaller than the difference of a predefined number and a guard band value, the difference is computed and a number of zero bytes according to this difference is added to the final picture count to ensure said pseudo-constant bits per frame compressed signal.

18. The method of claim 1, wherein said method is implemented within an MPEG encoder.

19. The method of claim 1, wherein said dynamically encoding further comprises encoding said frame of the new scene as a intra-coded frame.

20. A system for processing a sequence of video frames, said system comprising:
an encoder for dynamically encoding said sequence of video frames to produce a pseudo-constant bits per frame compressed signal at a scene change within said sequence of video frames, said encoder comprising:
means for detecting when a new scene occurs in the sequence of video frames; and
means for dynamically determining a group of frequency domain pixel data to be retained for a frame of the new scene responsive to said detecting of the new scene, said means for dynamically determining comprising means for employing a frequency domain data management model.

21. A system for processing a sequence of video frames, said system comprising:
an encoder for dynamically encoding said sequence of video frames to produce a pseudo-constant bits per frame compressed signal at a scene change within said sequence of video frames, said encoder comprising:
means for detecting when a new scene occurs in the sequence of video frames;
means for dynamically determining a group of frequency domain pixel data to be retained for a frame of the new scene responsive to said detecting of the new scene; and
wherein said means for dynamically determining comprises means for determining a level of frequency domain pixel data to be retained from multiple predefined levels, and wherein said means for determining determines the level of frequency domain pixel data to be retained for an initial frame of the new scene.

22. The system of claim 21, wherein said level of frequency data to be retained is associated with a frequency constraining pattern, and said means for determining comprises means for selecting a frequency constraining pattern to be employed from a plurality of frequency constraining patterns associated with said multiple predefined levels.

23. The system of claim 22, wherein said plurality of frequency patterns comprise a common geometrical shape, and wherein said common geometrical shape of said plurality of frequency patterns can be one of a plurality of common geometrical shapes.

24. The system of claim 22, wherein at least one most significant frequency pixel is included by each of the plurality of frequency constraining patterns.

25. The system of claim 20, wherein said means for dynamically determining comprises means for determining said group of frequency domain pixel data to be retained for said frame of the new scene by evaluating picture difficulty of the new scene.

26. A system for processing a sequence of video frames, said system comprising:
an encoder for dynamically encoding said sequence of video frames to produce a pseudo-constant bits per frame compressed signal at a scene change within said sequence of video frames, said encoder comprising:
means for detecting when a new scene occurs in the sequence of video frames;
means for dynamically determining a group of frequency domain pixel data to be retained for a frame of the new scene responsive to said detecting of the new scene;
wherein said means for dynamically determining comprises means for determining said group of frequency domain pixel data to be retained for said frame of the new scene by evaluating picture difficulty of the new scene; and
wherein said means for dynamically determining further comprises means for ascertaining picture difficulty indicators representative of picture difficulty of the new scene, wherein said picture difficulty indicators are ascertained by computing pixel-to-pixel differences in at least some of horizontal, vertical, and diagonal directions.

27. The system of claim 26, wherein said picture difficulty indicators are ascertained by computing pixel-to-pixel differences in each of said horizontal, vertical, and diagonal directions.

28. The system of claim 26, wherein said means for ascertaining comprises means for determining a maximum indicator for a frame picture of a progressive video source or a field picture of an interlaced video source, said maximum indicator being determined by comparing said picture difficulty indicators to each other.

29. The system of claim 26, wherein said means for ascertaining comprises means for ascertaining picture difficulty indicators in vertical and diagonal directions for both top and bottom fields of a frame of an interlaced video source, and picture difficulty indicators in vertical and diagonal directions for the frame of the interlaced video source, and wherein said means for ascertaining further comprises means for ascertaining field-based indicators in vertical and diagonal directions by computing a weighted summation of individual top and bottom field indicators having a same direction, and wherein for each vertical and diagonal direction, a picture difficulty indicator is determined by ascertaining a minimum number between a corresponding field-based indicator and a frame-based indicator derived from the same frame of the interlaced video source.

30. The system of claim 29, wherein said means for ascertaining comprises means for selecting said picture difficulty indicators by determining a maximum indicator of the ascertained vertical and diagonal indicators, as well as a horizontal indicator.

31. The system of claim 28, wherein said means for ascertaining further comprises means for mapping the maximum indicator to a level of an n-level quantizer if the value of the maximum indicator is between predefined thresholds, and for mapping the maximum indicator to a constant number if the indicator is outside of said predefined thresholds.

32. The system of claim 31, further comprising means for employing said mapping to identify an address of a frequency pattern in a look-up table, said look-up table containing a plurality of frequency patterns, and wherein said means for determining comprises means for selecting one frequency pattern of said plurality of frequency patterns.

33. The system of claim 32, wherein when the maximum indicator has a large nominal value it is re-mapped into a frequency pattern comprising a lesser number of frequency coefficients than a number of coefficients of a frequency pattern corresponding to when the maximum indicator has a smaller nominal value.

34. The system of claim 33, wherein said plurality of frequency patterns are indexed such that a population of one frequency pattern is a subset of a population of a frequency pattern with a lower index number.

35. The system of claim 33, wherein said means for determining comprises means for comparing each frequency coefficient of a block with respect to said selected frequency pattern, and if the coefficient belongs to the frequency pattern, the coefficient is retained as part of said group of frequency domain pixel data.

36. The system of claim 20, wherein after a final frame count, if the actual frame bits is smaller than a difference of a predefined number and a guard band value, said system further comprises means for computing the difference and adding a number of zero bytes according to this difference to the final picture count to ensure said pseudo-constant bits per frame compressed signal.

37. The system of claim 20, wherein said encoder comprises an MPEG encoder.

38. The system of claim 20, wherein said means for dynamically encoding further comprises means for encoding said frame of the new scene as a intra-coded frame.

39. A system for processing a sequence of video frames, said system comprising:
an encoder for dynamically encoding said sequence of video frames to produce a pseudo-constant bits per frame compressed signal at a scene change within said sequence of video frames, said encoder comprising a frequency domain data management unit, said frequency domain data management unit comprising:
a scene-change detector for detecting when a new scene occurs in the sequence of video frames;
a picture difficulty evaluator for evaluating picture difficulty of the new scene;
a frequency classifier and constrainer for dynamically determining a group of frequency domain pixel data to be retained for a frame of the new scene responsive to said detecting of the new scene and complexity of the picture as determined by said picture difficulty evaluator.

40. At least one program storage device readable by a machine, tangibly embodying at least one program of instructions executable by the machine to perform a method for processing a sequence of video frames, said method comprising:
dynamically encoding said sequence of video frames to produce a pseudo-constant bits per frame compressed signal at a scene change within said sequence of video frames, said dynamically encoding comprising:
detecting when a new scene occurs in the sequence of video frames; and
responsive to said detecting, dynamically determining a group of frequency domain pixel data to be retained for a frame of the new scene using a frequency domain data management model.

41. At least one program storage device readable by a machine, tangibly embodying at least one program of instructions executable by the machine to perform a method for processing a sequence of video frames, said method comprising:
dynamically encoding said sequence of video frames to produce a pseudo-constant bits per frame compressed signal at a scene change within said sequence of video frames, said dynamically encoding comprising:
detecting when a new scene occurs in the sequence of video frames;
responsive to said detecting, dynamically determining a group of frequency domain pixel data to be retained for a frame of the new scene; and
wherein said dynamically determining comprises determining a level of frequency domain pixel data to be retained from multiple predefined levels, and wherein said determining determines the level of frequency domain pixel data to be retained for an initial frame of the new scene.

42. The at least one program storage device of claim 41, wherein said level of frequency data to be retained is associated with a frequency constraining pattern, and said determining comprises selecting a frequency constraining pattern to be employed from a plurality of frequency constraining patterns associated with said multiple predefined levels.

43. The at least one program storage device of claim 42, wherein said plurality of frequency patterns comprise a common geometrical shape, and wherein said common geometrical shape of said plurality of frequency patterns can be one of a plurality of common geometrical shapes.

44. The at least one program storage device of claim 42, wherein at least one most significant frequency pixel is included by each of the plurality of frequency constraining patterns.

45. The at least one program storage device of claim 40, wherein said dynamically determining comprises determining said group of frequency domain pixel data to be retained for said frame of the new scene by evaluating picture difficulty of the new scene.

46. At least one program storage device readable by a machine, tangibly embodying at least one program of instructions executable by the machine to perform a method for processing a sequence of video frames, said method comprising:
dynamically encoding said sequence of video frames to produce a pseudo-constant bits per frame compressed signal at a scene change within said sequence of video frames, said dynamically encoding comprising:
detecting when a new scene occurs in the sequence of video frames;
responsive to said detecting, dynamically determining a group of frequency domain pixel data to be retained for a frame of the new scene;
wherein said dynamically determining comprises determining said group of frequency domain pixel data to be retained for said frame of the new scene by evaluating picture difficulty of the new scene; and
wherein said dynamically determining further comprises ascertaining picture difficulty indicators representative of picture difficulty of the new scene, wherein said picture difficulty indicators are ascertained by computing pixel-to-pixel differences in at least some of horizontal, vertical, and diagonal directions.

47. The at least one program storage device of claim 46, wherein said picture difficulty indicators are ascertained by computing pixel-to-pixel differences in each of said horizontal, vertical, and diagonal directions.

48. The at least one program storage device of claim 46, wherein said ascertaining comprises determining a maximum indicator for a frame picture of a progressive video source or a field picture of an interlaced video source, said maximum indicator being determined by comparing said picture difficulty indicators to each other.

49. The at least one program storage device of claim 46, wherein said ascertaining comprises ascertaining picture difficulty indicators in vertical and diagonal directions for both top and bottom fields of a frame of an interlaced video source, and picture difficulty indicators in vertical and diagonal directions for the frame of the interlaced video source, and wherein said ascertaining further comprises ascertaining field-based indicators in vertical and diagonal directions by computing a weighted summation of individual top and bottom field indicators having a same direction, and wherein for each vertical and diagonal direction, a picture difficulty indicator is determined by ascertaining a minimum number between a corresponding field-based indicator and a frame-based indicator derived from the same frame of the interlaced video source.

50. The at least one program storage device of claim 49, wherein said ascertaining comprises selecting said picture difficulty indicators by determining a maximum indicator of the ascertained vertical and diagonal indicators, as well as a horizontal indicator.

51. The at least one program storage device of claim 48, wherein said ascertaining further comprises mapping the maximum indicator to a level of an n-level quantizer if the value of the maximum indicator is between predefined thresholds, and mapping the maximum indicator to a constant number if the indicator is outside of said predefined thresholds.

52. The at least one program storage device of claim 48, further comprising employing said mapping to identify an address of a frequency pattern in a look-up table, said look-up table containing a plurality of frequency patterns, and wherein said determining comprises selecting one frequency pattern of said plurality of frequency patterns.

53. The at least one program storage device of claim 52, wherein when the maximum indicator has a large nominal value it is re-mapped into a frequency pattern comprising a lesser number of frequency coefficients than a number of coefficients of a frequency pattern corresponding to when the maximum indicator has a smaller nominal value.

54. The at least one program storage device of claim 53, wherein said plurality of frequency patterns are indexed such that a population of one frequency pattern is a subset of a population of a frequency pattern with a lower index number.

55. The at least one program storage device of claim 53, wherein said determining comprises comparing each frequency coefficient of a block with respect to said selected frequency pattern, and if the coefficient belongs to the frequency pattern, the coefficient is retained as part of said group of frequency domain pixel data.

56. The at least one program storage device of claim 40, wherein after a final frame count, if the actual frame bits is smaller than the difference of a predefined number and a guard band value, the difference is computed and a number of zero bytes according to this difference is added to the final picture count to ensure said pseudo-constant bits per frame compressed signal.

57. The at least one program storage device of claim 40, wherein said method is implemented within an MPEG encoder.

58. The at least one program storage device of claim 40, wherein said dynamically encoding further comprises encoding said frame of the new scene as a intra-coded frame.

* * * * *

UNITED STATES PATENT AND TRADEMARK OFFICE
CERTIFICATE OF CORRECTION

PATENT NO. : 6,914,939 B1
DATED : July 5, 2005
INVENTOR(S) : Boice et al.

It is certified that error appears in the above-identified patent and that said Letters Patent is hereby corrected as shown below:

Column 9,
Lines 1-15, insert the following Formula (4) structure in place of the structure.

$$z_{F,d45} = (g_1 + g_2 + g_3)^{-1}((m_r - 1)^{-1}(m_c - 1)^{-1} \sum_{i=1}^{m_r-1} \sum_{j=0}^{m_c-2} g_1 |y_t(i,j) - y_t(i-1,j+1)|$$

$$+ (n_r - 1)^{-1}(n_c - 1)^{-1} \sum_{i=1}^{n_r-1} \sum_{j=0}^{n_c-2} g_2 |cb_t(i,j) - cb_t(i-1,j+1)| \quad (4)$$

$$+ (n_r - 1)^{-1}(n_c - 1)^{-1} \sum_{i=1}^{n_r-1} \sum_{j=0}^{n_c-2} g_3 |cr_t(i,j) - cr_t(i-1,j+1)|)$$

Signed and Sealed this

Sixth Day of September, 2005

JON W. DUDAS
*Director of the United States Patent and Trademark Office*